(12) United States Patent
Shimizu et al.

(10) Patent No.: US 6,288,153 B1
(45) Date of Patent: Sep. 11, 2001

(54) POLYHEXAMETHYLENEADIPAMIDE FIBER AND COMPOSITION

(75) Inventors: Katsuya Shimizu; Hiroshi Tomiyama, both of Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/227,569

(22) Filed: Jan. 8, 1999

Related U.S. Application Data

(62) Division of application No. 08/750,093, filed as application No. PCT/JP95/00758 on Apr. 18, 1995, now Pat. No. 5,929,148.

(30) Foreign Application Priority Data

May 26, 1994 (JP) .................................................. 6-113019

(51) Int. Cl.[7] .............................. C08L 77/00; D01F 6/90
(52) U.S. Cl. .......................... 524/397; 524/394; 524/423; 524/429; 524/430
(58) Field of Search .................................. 524/397, 394, 524/423, 429, 430

(56) References Cited

U.S. PATENT DOCUMENTS

| | | |
|---|---|---|
| 3,078,248 | 2/1963 | Ben . |
| 3,334,046 | 8/1967 | Dexter et al. . |

FOREIGN PATENT DOCUMENTS

| | | |
|---|---|---|
| 1282844 | 11/1968 | (DE) . |
| 46-7455 | 2/1971 | (JP) . |
| 46-27308 | 8/1971 | (JP) . |
| 49-42906 | 11/1974 | (JP) . |
| 54-82496 | 6/1979 | (JP) . |
| 1-104654 | 4/1989 | (JP) . |
| WO94/19394 | 9/1994 | (WO) . |

OTHER PUBLICATIONS

XP002075126 Derwent Abstract Apr. 1989.

*Primary Examiner*—Patricia A. Short
(74) *Attorney, Agent, or Firm*—Finnegan, Henderson, Farabow, Garrett & Dunner, L.L.P.

(57) ABSTRACT

The present invention provides polyhexamathylene adipamide fibers significantly excellent in thermal yellowing resistance, and a process for producing the same. The improved polyhexamethylene adipamide fibers have adaptability to fibers for clothing which adaptability is comparable to that of poly-$\epsilon$-capramide fibers and polyester fibers. The improved polyhexamethylene adipamide fibers can be obtained by either (1) melt spinning a polyhexamethylene adipamide simultaneously containing 2,4-bis(alkylthio)-6-(3,5-dialkyl-4-hydroxyanilino)-1,3,5-triazine and a compound selected from the group consisting of phosphorous acid, hypophosphorous acid and derivatives of these acids, or (2) melt spinning the fibers having the sum of an amino end group concentration ([—NH$_2$)]) and a carboxyl end group concentration ([—COOH]) of 70 to 200 meq/kg, satisfying the condition: [—COOH]$\leqq$60 meq/kg, and containing from 0.005 to 0.5% by weight of an alkali metal compound, or (3) melt spinning under conditions wherein the melt spinning in (1) and that in (2) are combined.

3 Claims, No Drawings

POLYHEXAMETHYLENEADIPAMIDE FIBER AND COMPOSITION

This is a division of application Ser. No. 08/750,093, now U.S. Pat. No. 5,929,148, which was the National Stage application of International Application PCT/JP95/00758 filed Apr. 18, 1995.

FIELD OF THE INVENTION

The present invention relates to hexamethylene adipamide fibers having significantly excellent thermal yellowing resistance to heat during fiber processing, etc. and a composition thereof, ad a process for advantageously producing such fibers. The present invention relates to polyhexamethylene adipamide fibers for clothing capable of being dyed in bright shades and dyed deeply in addition to having significantly excellent thermal yellowing resistance, and a commercially advantageous process for producing the same.

BACKGROUND OF THE INVENTION

Since polyamides (nylon) are generally excellent in mechanical properties and durability, they are used in large amounts as fibers for industrial materials such as tire cords, fibers for carpet and molded articles. On the other hand, polyamides are also used in large amounts as fibers for clothing, particularly for inner wear due to their excellent flexibility and dyeability.

Polyhexamethylene adipamide (nylon 66) is a typical representative of polyamides, and is also used as fibers for industrial materials, fibers for carpet, fibers for clothing, molded articles, and the like. Polyhexamethylene adipamide, however, has a serious disadvantage as fiber for clothing in that it suffers considerable thermal yellowing compared with poly-ε-capramide (nylon 6) which is also a typical representative of polyamides. The disadvantage matters a great deal regardless of whether it is used as fibers or molded articles, in application where the whiteness in external appearance is required. In addition to the fact that fibers for clothing are particularly susceptible to oxidation inherently due to the small single fiber diameter (large specific surface area), they are thermally set (heat treated) without exception in the process for producing fabrics and in fabrication. As a result, the problem of yellowing mentioned above is manifested. The use of polyhexamethylene adipamide in fibers for clothing is, therefore, extremely limited.

For example, inner wear such as lingerie and foundation garments is an appropriate application for polyamide fibers having flexibility and suitable hygroscopicity. Since polyhexamethylene adipamide fibers suffer considerable yellowing during thermal setting as described above, the whiteness of the products is lowered or the color development thereof becomes a dull shade (dull in shade). Accordingly, the polyhexamethylene adipamide fibers are not substantially used at present for inner wear. Poly-ε-capramide fibers and polyester fibers have overwhelmingly high shares at present in the application thereof to the inner wear.

Since the poly-ε-capramide fibers are significantly excellent in thermal yellowing resistance and suffer thermal setting-caused yellowing very slightly, compared with the polyhexamethylene adipamide fibers, they can be used for the inner wear substantially without a problem. Moreover, the polyester fibers have still more excellent thermal yellowing resistance than the poly-ε-capramide fibers, and suffer almost no yellowing caused by thermal setting, that is, the whiteness of the fibers is maintained.

Improving the thermal yellowing resistance of the polyhexamethylene adipamide fibers to a level comparable to that of the poly-ε-capramide fibers is, therefore, the first goal for the manufacturers thereof. Improving the resistance to a level comparable to that of the polyester fibers is the final goal for them. The techniques for achieving these goals, however, have not been created.

In melt molding and melt spinning thermoplastic organic polymer, a thermal stabilizer such as a thermal oxidation inhibitor is incorporated in the polymer starting materials to inhibit or decrease the thermal alteration such as thermal degradation and discoloration of the polymer. Although the selection of suitable additives depends on the types of polymers, examples the thermal stabilizer commonly used for polymers which have currently been used at large are phenolic antioxidants including hindered phenols. The level of degradation resistance of a polymer considerably differs depending on the requirement of polymer molded articles to be produced therefrom. As a result, various incorporation formulations such as the use of phenolic antioxidants in combination with other chemical substances, for example, organic antimony compounds, phosphorous compounds and thioether antioxidants have been attempted.

Japanese Patent KOKAI Publication No. 46-7455 discloses that the incorporation of organic antimony compounds and phenolic antioxidants prevents the oxidation deterioration of polymers of all types including polyolefin. Numerous phenolic antioxidants including 2,4-bis(alylthio)-6-(3,5-dialkyl-4-hydroxyanilino)-1,3,5-triazine are exemplified in the specification of the patent publication. Concrete examples in which the triazine derivatives are applied to polypropylene as antioxidants are disclosed therein. The prior technique evaluates the antioxidation effect on the polymer by an oxygen absorption amount, and does not refer to the thermal yellowing prevention effect on the polymer.

Japanese Patent KOKAI Publication No. 6-16929 discloses that the incorporation of the three types of agents: hindered phenolic antioxidants, phosphorus type antioxidants and thioether type antioxidants, in polyamides can suppress the discoloration caused by oxidation deterioration of injection molded polyamide articles. The patent publication, however, discloses no quantitative effect of inhibiting discoloration. As a result of investigation, the present inventors have found that no satisfactory thermal yellowing resistance can be obtained even when the compounds in the patent publication are incorporated in the polyhexamethylene adipamide fibers. For example, when the fibers to be used for lingerie are to be dyed in pale pink or pale blue, the desired color development cannot be obtained due to yellowing caused by thermal setting, and only products giving an impression of a dull shade can be obtained. That is, a thermal yellowing resistance which promotes the utilization of the polyhexamethylene adipamide fibers in the field of inner wear has not been obtained at any by the techniques disclosed in the patent publication. Moreover, among the antioxidants exemplified in the patent publication, there is no 2,4-bis(alkylthio)-6-(3,5-dialkyl-4-hydroxyanilino)-1,3,5-triazine.

The specification of Japanese Patent KOKAI Publication No. 51-1557 discloses that the incorporation of a phenolic antioxidant which completely differs from the compound of the present invention and which has a specific structure and, if necessary, a phosphorus compound can suppress the thermal yellowing of the polyamides. The patent publication, however, gives no description related to the effect of preventing thermal yellowing. As a result of investigation, the present inventors have found that sufficient inhibition of the thermal yellowing cannot be achieved even when the compounds disclosed in the patent publication are incorporated in the polyhexamethylene adipamide fibers. For example, when the fibers to be used for lingerie are to be dyed to pale pink or pale blue, the desired color development cannot be obtained due to yellowing caused by thermal setting, and only products giving an impression of a dull shade can be obtained. That is, a thermal yellowing resistance which promotes the utilization of the polyhexamethylene adipamide fibers in the field of inner wear has not been obtained at all by the technique disclosed in the patent publication.

Furthermore, since the compounds concretely disclosed in the specification of the patent publication have low heat resistances, adverse effects of deteriorating the compounds themselves have been caused when the compounds are melt kneaded with polyhexamethylene adipamide having a melting point as high as more than 260° C.

The specification of U.S. Pat. No. 3,594,448 discloses that many types of hindered phenol compounds are effective in improving the whiteness of fibers obtained from a blend of polyamides and polyesters. Among the hindered phenol compounds, the triazine derivative [I] mentioned above is also included. In the invention disclosed in the specification of U.S. patent, however, a deterioration reaction at the boundary between the two components, the polyamide and the polyester, which reaction is a phenomenon specific to the blend thereof, is inhibited. As a result, yellowing which occurs after blending is improved.

Japanese Patent KOKOKU Publication No. 55-20498 discloses that the incorporation of three types of substances: a metal salt of boric acid, an organic phosphorus compound and a phenol having steric hindrance, in a polyamide having ring structures in the principal chain can inhibit coloring and yellowing of the polyamide. The invention of the patent publication, however, solves the problem specific to a polyamide having ring structures. That is, the invention aims at preventing the polymer from lowering its molecular weight, gelling and yellowing by inhibiting the thermal decomposition reaction of the molecular chain thereof caused by the amino end groups tLhereof.

The specification of Japanese Patent KOKAI Publication No. 54-82496 discloses that 2,4-bis(alkylthio)-6-(3,5-dialkyl-4-hydroxyanilino)-1,3,5-triazine is effective in improving the thermal stability of a double bond-containing polymer such as rubber. The specification of the patent publication does not suggest that the compound is effective in inhibiting the yellowing of a polyamide, particularly the polyhexamethylene adipamide fibers.

It has heretofore been a general practice to inhibit the thermal deterioration of polyamides by incorporating N,N'-hexamethylenebis(3,5-di-tert-butyl-4-hydroxyhydrocinnamamide) (e.g., "Stabilization Formulations for Recent Development of the Application of PolyamideResins," Ciba Geigy (Japan) Limited). However, even though the improvement of the mechanical thermal stability of the polyhexamethylene adipamide is achieved by the use of the compound, the effect of inhibiting considerable thermal yellowing specific to the polymer is extremely insufficient.

The amino end group concentration of the polyamide fibers is closely related to the deep dyeability of the fibers and the spinnability of the polyamide polymer. Polyamide fibers which have a high amino end group concentration and which are dyeable with an acid dye are The specification of U.S. Pat. No. 3,078,248 discloses that when the amino end group concentration of polyhexamethylene adipamide is increased, drips frequently occur during melt spinning, and consequently normal spinning becomes difficult. Those skilled in the art know well that when the amino end group concentration becomes high, drips and breaks frequently occur, and that the frequent occurrence thereof is caused by the promotion of the thermal decomposition and branch-forming reaction of the amino end groups.

Accordingly, industrial spinning of the polyhexamethylene adipamide fibers has been achieved to a normal spinning level by the use of a polymer poor in the amino end group concentration, namely rich in the carboxyl end group concentration (e.g., Japanese Patent KOKOKU Publication No. 3-57966).

In general, organic phosphorus compounds having specific structures (specification of U.S. Pat. No. 3,078,248), and alkali metal salts of dicarboxylic acids or aminocarboxylic acids (Japanese Patent KOKAI Publication No. 1-104654) are disclosed as stabilizers for inhibiting drips and breaks during melt spinning (thermal decomposition inhibitors, branch-formation inhibitors).

An object of the present invention in the broadest sense is to raise the level of the properties of the polyhexamethylene adipamide fibers during use, particularly that of the spectrum of properties of fibers for clothing to the level comparable to that of the polycapramide fibers and the polyester fibers.

A concrete object of the present invention is to provide polyhexamethylene adipamide fibers having a thermal yellowing resistance at least comparable to that of the polycapramide fibers.

Another concrete object of the present invention is to provide polyhexamethylene adipamide fibers containing amino end groups of high concentration and having improved properties as fibers for clothing and an improved process for producing the same.

Still another concrete object of the present invention is to provide polyhexamethylene adipamide fibers having both thermal yellowing resistance to a high level and deep dyeability.

An intended object of the present invention is to provide a composition useful for obtaining molded articles such as polyhexamethylene adipamide fibers having thermal yellowing resistance.

DISCLOSURE OF THE INVENTION

A first aspect of the present invention is based on the knowledge that a polyhexamethylene adipamide comprising (A) 2,4-bis(alkylthio)-6-(3,5-dialkyl-4-hydroxyanilino)-1,3,5-triazine and (B) one or a plurality of phosphorus-containing compounds selected from the group consisting of phosphorous acid, phosphorous acid derivatives, hypophosphorous acid and hypophosphorous acid derivatives exhibits thermal yellowing resistance to a high degree. That is, the first mode of the present invention denotes fibers of a polyhexamethylene adipamide comprising, in the molecular chain, from 100 to 70% by weight of hexamethylene adipamide repeat units of the formula

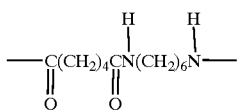

or fibers of a blend comprising from 100 to 70% by weight of the polyhexamethylene adipamide and from 0 to 30% by weight of other polyamdies, said fibers comprising (A) from 0.01 to 1.0% by weight of 2,4-bis(alkylthio)-6-(3,5-dialkyl-4-hydroxyanilino)-1,3,5-triazine represented by the general formula

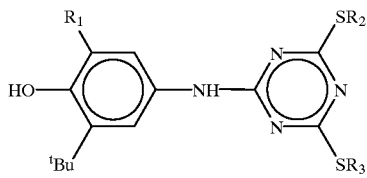

[I]

wherein $R_1$ is $^tBu$ or a hydrocarbon group having from 1 to 4 carbon atoms, and $R_2$ and $R_3$ are each a hydrocarbon group having from 5 to 10 carbon atoms; and (B) from 0.005 to 1.0% by weight of one or a plurality of compounds gelected from the groun consisting of phosphorous acid, phosphorous acid derivatives, hypophosphorous acid and hypophosphorous acid derivatives.

The polyhexamethylene adipamide fibers thus specified have, as fibers for clothing such as inner wear strictly required to have whiteness, thermal yellowing resistance comparable to poly-ε-capramide fibers, whatever the range of the end group concentrations may be, and do not lower their whiteness substantially even when subjected to processing involving heating.

A second mode of the present invention specifies polyhexamethylene adipamide fibers which are deeply dyeable with an acid dye and thermal yellowing-resistant. That is, the second mode thereof denotes polyhexamethylene adipamide fibers having the sum of an amino end group concentration ($[—NH_2]$) and a carboxyl end group concentration ($[—COOH]$) of 70 to 200 meq/kg, comprising, in the molecular chain, from 100 to 70% by weight of hexamethylene adipamide repeat units of the formula

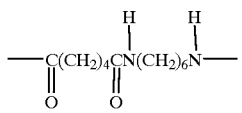

satisfying (a) $[—COOH] \leq 60$ (meq/kg), and comprising (b) from 0.005 to 0.5% by weight of an alkali metal compound.

It should be particularly noted that the polyhexamethylene adipamide fibers thus specified show dramatically decreased strength lowering when subjected to pressurized hot water treatment at temperature as high as at least 100° C. (pleating, dyeing at high temperature and high pressure), compared with conventional polyhexamethylene adipamide fibers.

A third mode of the present invention denotes highly thermal yellowing-resistant, deeply dyeable polyhexamethylene adipamide fibers obtained by combining the first and the second mode. That is, the third mode of the present invention denotes thermal yellowing-resistant, deeply dyeable polyhexamethylene adipamide fibers having the sum of an amino end group concentration ($[—NH_2]$) and a carboxyl end group concentration ($[—COOH]$) of 75 to 175 meq/kg, comprising, in the molecular chain, from 100 to 70% by weight of hexamethylene adipamide repeat units of the formula

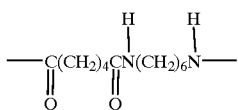

satisfying simultaneously (a) $[—COOH] \leq 60$ (meq/kg), and (c) $[—NH_2] \geq 55$ (meq/kg), and comprising (A) from 0.01 to 1.0% by weight of 2,4-bis(alkylthio)-6-(3,5-dialkyl-4-hydroxyanilino)-1,3,5-triazine represented by the general formula

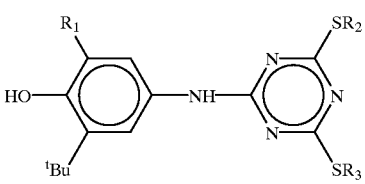

[I]

wherein $R_1$ is $^tBu$ or a hydrocarbon group having from 1 to 4 carbon atoms, and $R_2$ and $R_3$ are each a hydrocarbon group having from 5 to 10 carbon atoms, and (B) from 0.005 to 1.0% by weight of one or a plurality of compounds selected from the group consisting of phosphorous acid, phosphorous acid derivatives, hypophosphorous acid and hypophosphorous acid derivatives.

A fourth mode of the present invention is an invention of a process for producing a polyhexamethylene adipamide, and is specified as described below. That is, the fourth mode denotes a process for producing thermal yellowing-resistant, deeply dyeable polyhexamethylene adipamide fibers, which process comprises melt spinning a polyhexamethylene adipamide having the sum of an amino end group concentration ($[—NH_2]$) and a carboxyl end group concentration ($[—COOH]$) of 75 to 175 meq/kg, and comprising, in the molecular chain, from 100 to 70% by weight of hexamethylene adipamide repeat units of the formula

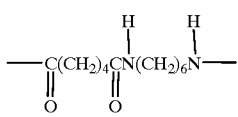

said polyhexamethylene adipamide simultaneously satisfying (a) $[—COOH] \leq 60$ (meq/kg), and (c) $[—NH_2] \geq 55$ (meq/kg), and comprising (A) from 0.01 to 1.0% by weight of 2,4-bis(alkylthiol-6-(3,5-dialkyl-4-hydroxyanilino)-1,3,5-triazine represented by the general formula

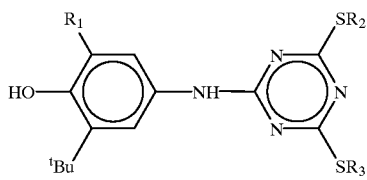

wherein $R_1$ is $^tBu$ or a hydrocarbon group having from 1 to 4 carbon atoms, and $R_2$ and $R_3$ are each a hydrocarbon group having from 5 to 10 carbon atoms, (B) from 0.005 to 1.0% by weight of one or a plurality of compounds selected from the group consisting of phosphorous acid, phosphorous acid derivatives, hypophosphorous acid and hypophosphorous acid derivatives, and (C) from 0.005 to 0.5% by weight of alkali metal compounds.

BEST MODE FOR PRACTICING THE PRESENT INVENTION

In the present invention, the terminology "polyhexamethylene adipamide" denotes a polymer containing, in the molecular chain, from 70 to 100% by weight, preferably from 85 to 100% by weight of hexamethylene adipamide repeat units of the formula

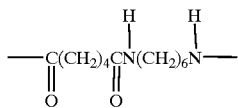

or a blend of the polymer and other polyamides. A polymer containing less than 70% by weight of the hexamethylene adipamide repeat units loses such advantages of the polyhexamethylene adipamide fibers as having dye fastness and dimension stability to a high degree. The blend containing other polyamides in an amount exceeding 30% by weight similarly loses the advantages of the polyhexamethylene adipamide fibers. Examples of the polymer or the blend used in the present invention are, in addition to a polymer containing 100% by weight of the polyhexamethylene adipamide, a copolymer or a blend thereof with a polymer such as nylon 6, nylon 12, nylon 610, nylon 612, nylon 46 or nylon 6T.

The polyhexamethylene adipamide fibers according to the second mode of the present invention are required to have the sum of the amino and group concentration ([—$NH_2$]) and the carboxyl end group concentration ([—COOH]) of 70 to 200 meq/kg, preferably 75 to 175 meq/kg. The sum of the two end group concentrations defines the number average molecular weight of the polymer, accordingly the polymer viscosity. When the sum of the end group concentrations is less than 70 meq/kg, the polymer viscosity becomes too high, and spinning becomes difficult. On the other hand, when the sum thereof exceeds 200 meq/kg, the polymer viscosity becomes too low, and the drawability may be impaired, or the mechanical strength of the fibers is lowered. As a result, practical fibers cannot be obtained. The practically most desirable range of the sum is from 75 to 175 meq/kg.

The polyhexamethylene adipamide fibers having a greatly improved thermal yellowing resistance by control of the end group concentrations as in the second mode of the present invention are required to satisfy (a) [—COOH]$\leq$60 (meq/kg).

When the condition is not satisfied, the object of the present invention cannot be accomplished unless the fibers are allowed to contain 2,4-bis(alkylthio)-6-(3,5-dialkyl-4-hydroxyanilino)-1,3,5-triazine. The most desirable range of the carboxyl end group concentration is as follows: [—COOH]$\leq$55 (meq/kg).

In the present invention, in cases where the thermal yellowing resistance of the polyhexamethylene adipamide fibers is synergistically improved and deep dyeability is imparted to the fibers by the combination of the method of allowing the fibers to contain specific compounds and the method of controlling the end group concentration, the carboxyl end group concentration and the amino end group concentration are required to satisfy the following respective conditions (a) and (c) simultaneously:

(a) [—COOH]$\leq$60 (meq/kg), and (c) [—$NH_2$]$\geq$55 (meq/kg)

Since the thermal yellowing resistance of the polymer itself is low when the condition (a) is not satisfied, the polyhexamethylene adipamide fibers cannot have the extremely excellent thermal yellowing resistance exceeding that of poly-$\epsilon$-capramide fibers and comparable to that of polyester fibers even when the compounds of the present invention are incorporated in the polymer. The most desirable range of the carboxyl end group concentration is as follows: [—COOH]$\leq$55 (meq/kg). On the other hand, when the condition (c) is not satisfied, the dyeability with an acid aye becomes innufficient, and deeply dyeable fibers having a high rate of dye exhaustion (at least 50 by the measurement according to the present invention) desired in the present invention cannot be obtained. Moreover, the characteristic advantage of the present invention that the strength lowering of the fibers caused by pressurized hot water treatment at high temperature of at least 100° C. is dramatically inhibited is not manifested. A more desirable range of the amino end group concentration is as follows: [—$NH_2$]$\leq$60 (meq/kg).

One of examples of 2,4-bis(alkylthio)-6-(3,5-dialkyl-4-hydroxyanilino)-1,3,5-triazine of the general formula [I] used in the present invention is 2,4-bis(n-octylthio)-6-(4-hydroxy-3,5-di-tert-butylanilino)-1,3,5-triazine. The exemplified compound is available as Irganox 565 (trade name, manufactured by Ciba Geigy).

A triazine derivative represented by the general formula [I] has not only a good compatibility with a polyhexamethylene adipamide but also its own high heat resistance. The triazine derivative, therefore, does not lower its antioxidizing activity even when melt kneaded with the polyhexamethylene adipamide having a high melting point exceeding 260° C. Moreover, since the triazine derivative has a thioether structure and an aromatic amine structure in addition to the structure of a phenolic antioxidant, it displays inhibiting effects on various elementary reactions constituting the thermal yellowing reaction of the polyhexamethylene adipamide. The content of the triazine derivative of the general formula [I] in the polyhexam ethylene adipamide is required to be from 0.01 to 1.0% by weight. When the content is less than 0.01% by weight, the excellent thermal yellowing resistance at which the present invention aims cannot be obtained unless the conditions of the end group concentrations in the present invention are satisfied. On the other hand, when the content exceeds 1.0% by weight, the spinning stability of the polyhexamethylene adipamide fibers is impaired. The most desirable content range is from 0.01 to 0.2% by weight.

In the first, the third and the fourth mode of the present invention, the polyhexamethylene adipamide fibers are required to contain, in addition to the triazine derivative of the general formula [I], from 0.005 to 1.0% by weight of one or a plurality of compounds selected from the group consisting of phosphorous acid, phosphorous acid derivatives, hypophosphorous acid and hypophosphorous acid derivatives. When the content is less than 0.005% by weight, the excellent thermal yellowing resistance cannot be obtained unless the terminal end group concentration of the present invention are satisfied. On the other hand, when the content exceeds 1.0% by weight, a considerable viscosity increase of the polyhexamethylene adipamide, spinning filter clogging, etc. occur, and the spinning stability is impaired. The most desirable content is from 0.005 to 0.2% by weight. Appropriate examples of the phosphorous acid derivative in the above group are bis(2,6-di-tert-butyl-4-methylphenyl) phosphite represented by the chemical formula [II] below, tris (2,4-di-tert-butylphenyl) phosphite represented by the chemical formula [III] below, and the like:

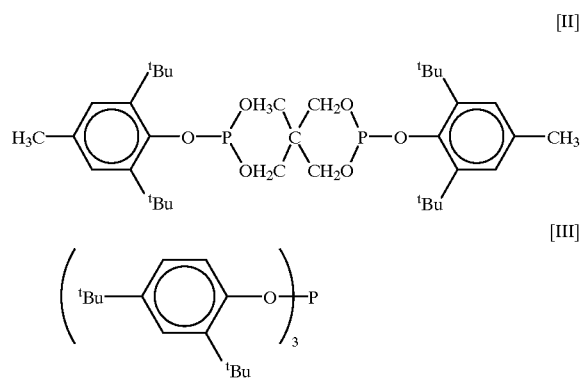

On the other hand, appropriate examples of the hypophosphorous acid derivative in the above group are potassium phenylphoshinate represented by the chemical formula [IV], tetrakis (2,4-di-tert-butylphenyl)-4,4'-biphenylylenediphosphonite represented by the chemical formula [V], and the like:

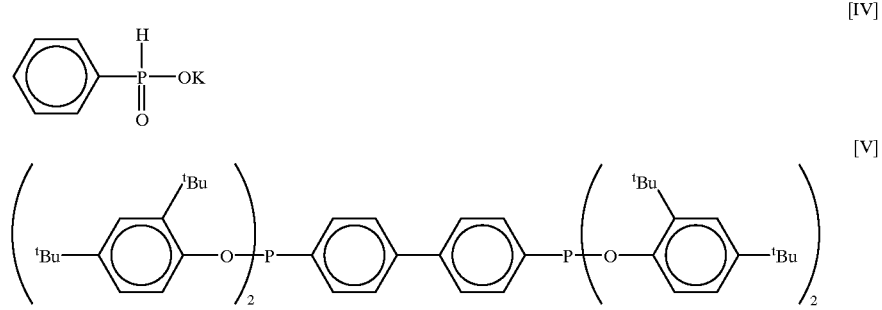

In the means for significantly improving the thermal yellowing resistance of the polyhexamethylene adipamide fibers by control of the end group concentrations in the present invention, the fibers are required to contain an alkali metal compound. When the compound is not contained, the thermal decomposition and branch-forming reaction of the polymer take place a great deal, and drips and breaks often occur. The content of the alkali metal compound is required to be from 0.005 to 0.5% by weight. When the content is less than 0.005% by weight, the thermal decomposition and branch-forming reaction cannot be suppressed sufficiently. On the other hand, when the content exceeds 0.5% by weight, disadvantages such as polymerization retardation and rapid clogging of the spinning filter medium are brought about. The most desired content range is from 0.01 to 0.2% by weight.

Effective examples of the alkali metal compound are alkali metal hydroxides such as sodium hydroxide and potassium hydroxide, alkali metal salts of inorganic acids such as sodium sulfate and potassium nitrate and alkali metal salts of organic acids such as sodium adipate and potassium acetate. Among these compounds, sodium adipate and potassium adipate are most effective In the third and the fourth mode of the present invention, there is no specific limitation on the procedures for allowing the fibers to contain (A) 2,4-bis(alkylthio)-6-(3,5-dialkyl-4-hydroxyanilino)-1,3,5-triazine of the general formula [I] and (B) one or a plurality of compounds selected from the group consisting of phosphorous acid, phosphorous acid derivatives, hypophosphorous acid and hypophosphorous acid derivatives. To incorporate the additives (A) and (B) in the polymer, any of procedures generally employed may be suitably selected. For example, a procedure of incorporating at the polymerization stage of the polymer, a procedure incorporating the use of a melt kneader such as a biaxial extruder may be used.

There is no specific limitation on the method for preparing the polymer so that the conditions (a) and (c) related to the carboxyl end group concentration and the amino end group concentration of the polyhexamethylene adipamide fibers are satisfied. For example, a simple method is as follows: hexamethylenediamine in an amount corresponding to the desired end group concentrations is added to an aqueous solution of hexamthylenediammonium adipate (AH salt), and polymerization is conventionally conducted. Since the hexamethylenediamine component generally escapes during polymerization, the escaping amount is suppressed, and the addition amount of the amine is determined in accordance with the amount. Moreover, in cases where the polymer containing nylon 66 is a blend comprising a plurality of polyamides, the end group concentrations may be adjusted by adjusting the terminal group concentrations of the plurality of polyamide chips, respectively in accordance with the blending proportion.

In the means for greatly improving the thermal yellowing resistance of the polyhexamethylene adipamide fibers by controlling the end group concentrations according to the present invention, there is no specific limitation on the procedure for allowing the fibers to contain the alkali metal compound. However, a procedure of adding the compound to the aqueous solution containing the starting material monomers and conventionally polymerizing the monomers is appropriate.

The fibers of the present invention can be simply produced by a known melt spinning machine. For example, it is satisfactory to adopt a method wherein a mixture of one or a plurality of types of polyamide chips and compounds of the present invention is directly fed to a melt spinning machine for general use to be spun, or a method wherein the mixture is fed to a biaxial kneader, etc. to give a blend, which is fed to a melt spinning machine for general use to be spun. The spinning rate may be suitably selected from a range of 100 to 8,000 m/min in accordance with the application of the products. Finishing agents having a composition in accordance with the application may be suitably imparted to the fibers.

The present invention may also be applied to functional products. When the polymer used for the fibers of the present invention is fed to an injection molding machine or extrusion molding machine, resin products having greatly improved thermal yellowing resistance may be readily and stably produced.

The fibers of the present invention may contain, in accordance with the application, additives other than the compounds essential to the present invention. For example, the fibers may contain a fluorescent brightener as well as a delustrant such as titanium oxide, a weathering agent such as manganese lactate, a light stabilizer such as a hindered amine and a UV absorber such as benzotriazole. Moreover, the fibers may also contain a generally used copper salt such as copper acetate and a metal halide such as potassium iodide and potassium bromide, so that the heat resistance is imparted thereto. Moreover, known additives such as calcium stearate and ethylenebis(stearamide) may also be incorporated if necessary.

The present invention will be explained in detail by making reference to examples.

In addition, compounds used in examples described below are shown in Table 1 and Table 2. Moreover, measurements in the following examples were made according to the procedures mentioned below.

(1) Carboxyl end group concentration: 4.0 g of a sample is dissolved in 50 ml of benzyl alcohol qt 170° C., and the concentration is determined by neutralization titrating the solution with a 1/10 N NaOH solution (solution in ethylene glycol) using phenolphthalein as an indicator.

(2) Amino end group concentration: 4.0 g of a sample is dissolved in 50 ml of 90% phenol at 50° C., and the concentration is determined by neutralization titrating the solution with 1/20 N HCl using a pH meter.

(3) Relative viscosity: 5.5 g of a sample is dissolved in 50 ml of 90% formic acid, and the relative viscosity is measured at 25° C.

(4) Yellowing factor: the Yellow Index (YI) and the whiteness (W) (Hunter system) of a knitted fabric is measured using Σ 90 COLOR MEASURING SYSTEM, SZ-OPTICAL SENSOR (light source C/2) (manufactured by Nippon Denshoku Kogyo K. K.).

(5) Rate of dye exhaustion: a sample is dyed with Diacid Alizarine Light Blue 4GL (C.I. Acid Blue 23; CI 61125) (3% owf) at a bath ratio of 1:100 at 90° C. for 45 minutes, and the rate of dye exhaustion is calculated from the absorbance of the dyeing solution.

(6) Retention of strength during treating with pressurized hot water at high temperature: a sample is treated with hot water at 130° C. for 30 minutes while being pressurized. The fiber strength of the sample is measured before and after the treatment, and the retention of the strength subsequent to the treatment to that prior to the treatment is calculated.

TABLE 1

Compound Group (A)

| Compound No. | Compound |
|---|---|
| A-1 | 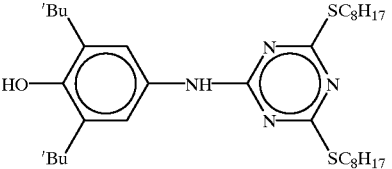<br>2,4-Bis(n-octylthio)-6-(4-hydroxy-3,5-di-tert-butylanilino)-1,3,5-triazine |
| A-2 | 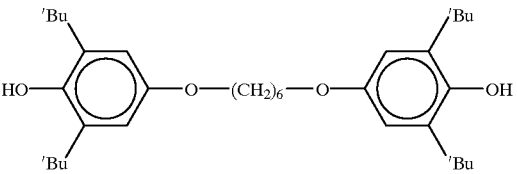<br>1,6-Bis(3,5-di-tert-butyl-4-hydroxyphenoxy)-hexane |
| A-3 | 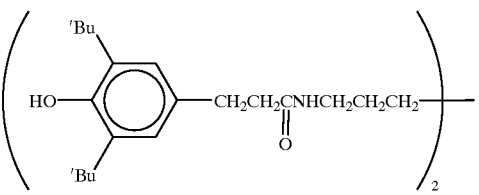 |

TABLE 1-continued

Compound Group (A)

| Compound No. | Compound |
|---|---|
| | N,N'-Hexamethylenebis(3,5-di-tert-butyl-4-hydroxyhydrocinnamamide) |
| A-4 | 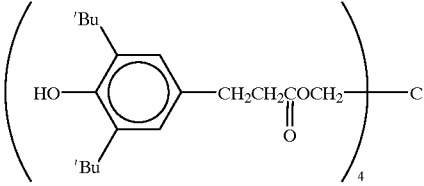 |
| | Pentaerythrityl-tetrakis[3-(3,5-di-tert-butyl-4-hydroxyphenyl)propionate |
| A-5 | 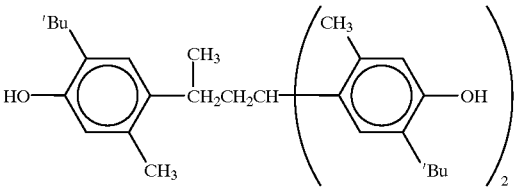 |
| | Tris(2-methyl-4-hydroxy-5-tert-butylphenyl)butane |
| A-6 | 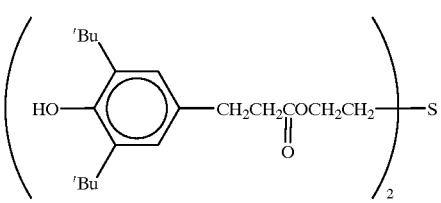 |
| | 2,2-Thiodiethylenebis[3-(3,5-di-tert-butyl-4-hydroxyphenyl)propionate] |
| A-7 | 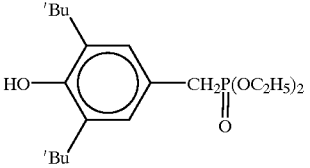 |
| | 3,5-Di-tert-butyl-4-hydroxybenzylphosphonate-diethyl ester |

TABLE 2

Compound Group (B)

| Compound No. | Compound |
|---|---|
| B-1 | 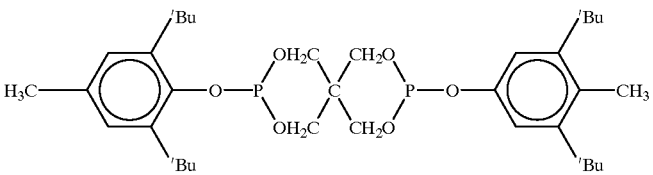 |
| | Bis(2,6-di-tert-butyl-4-methylphenyl) phosphite |

TABLE 2-continued

Compound Group (B)

| Compound No. | Compound |
|---|---|
| B-2 | 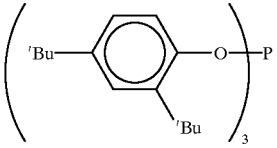<br>Tris(2,4-di-tert-butylphenyl) phosphite |
| B-3 | 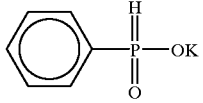<br>Potassium phenylphosphinate |
| B-4 | 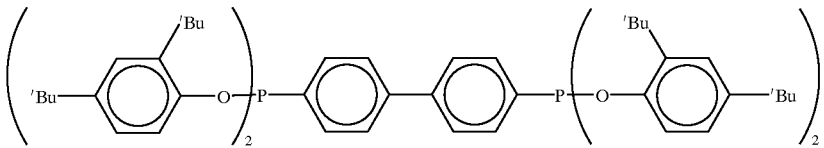<br>Tetrakis(2,4-di-tert-butylphenyl)-4,4'-biphenylylene-di-phosphonite |
| B-5 | $NaH_2PO_2$<br>Sodium hypophosphite |

EXAMPLES 1 to 6

Comparative Examples 1 to 8

A polyhexamethylene adipamide having a relative viscosity of 48, an amino end group concentration of 48 meq/kg and a carboxyl end group concentration of 78 meq/kg was mixed with various compounds in a composition as shown in Table 3, and the mixture was spun at a spinning temperature of 290° C. and a spinning rate of 4,500 m/min using a melt spinning machine to give yarns of 10 d/5 f Knitted fabrics were prepared from the yarns thus obtained, and a finishing agent was removed therefrom. The knitted fabrics were heated at 190° C. for 5 minutes, and the yellowing factors (YI) thereof were measured using the colorimeter mentioned above. The results are shown in Table 3.

In polyhexamethylene adipamide fibers containing compound A-1 which was a triazine derivative represented by the general formula [I] in Examples 1 to 6, thermal yellowing was markedly inhibited.

On the other hand, the fibers containing no compound (Comparative Example 1) and the fibers containing conventional Compounds (Comparative Examples 1 to 7) exhibited extremely marked thermal yellowing. Moreover, the fibers containing no compound A-1 and a phosphorous acid derivative alone (Comparative Example 8) exhibited marked thermal yellowing.

TABLE 3

| | Compound group (A) by weight) | Compound group (B) (% by weight) | Fine-ness (denier) | Strength (g/d) | Elonga-tion (%) | Shrink-age (%) in boil-ing water (%) | Yellow-ing factor (YI) (190° C. × 5 min) |
|---|---|---|---|---|---|---|---|
| Ex. 1 | A-1 (0.15) | B-1 (0.15) | 10 | 4.36 | 67.1 | 3.1 | 3 |
| Ex. 2 | A-1 (0.10) | B-1 (0.05) | 10 | 4.25 | 68.1 | 2.9 | 5 |
| Ex. 3 | A-1 (0.10) | B-2 (0.05) | 10 | 4.33 | 66.2 | 3.0 | 6 |
| Ex. 4 | A-1 (0.10) | B-3 (0.10) | 10 | 4.36 | 67.0 | 3.1 | 6 |
| Ex. 5 | A-1 (0.10) | B-4 (G.05) | 10 | 4.28 | 67.2 | 3.0 | 5 |
| Ex. 6 | A-1 (0.10) | B-5 (0.02) | 10 | 4.37 | 67.5 | 3.0 | 6 |

TABLE 3-continued

|  | Compound group (A) by weight) | Compound group (B) (% by weight) | Fineness (denier) | Strength (g/d) | Elongation (%) | Shrinkage (%) in boiling water (%) | Yellowing factor (YI) (190° C. × 5 min) |
|---|---|---|---|---|---|---|---|
| C. Ex. 1 | - | - | 10 | 4.30 | 67.9 | 3.0 | 32 |
| C. Ex. 2 | A-2 (0.20) | B-3 (0.10) | 10 | 4.35 | 67.6 | 3.1 | 24 |
| C. Ex. 3 | A-3 (0.10) | B-2 (0.05) | 10 | 4.28 | 67.8 | 3.0 | 22 |
| C. Ex. 4 | A-4 (0.10) | B-2 (0.05) | 10 | 4.26 | 67.5 | 2.9 | 20 |
| C. Ex. 5 | A-5 (0.10) | B-5 (0.02) | 10 | 4.33 | 66.5 | 3.0 | 24 |
| C. Ex. 6 | A-6 (0.10) | B-4 (0.05) | 10 | 4.35 | 66.8 | 3.1 | 26 |
| C. Ex. 7 | A-7 (0.10) | B-1 (0.05) | 10 | 4.36 | 66.9 | 3.1 | 27 |
| C. Ex. 8 | — | B-1 (0.05) | 10 | 4.33 | 66.4 | 3.0 | 24 |

EXAMPLES 7 to 8

Comparative Examples 9 to 10

An aqueous solution of a mixture of 90% by weight of hexamethylenediammonium adipate (AH salt) and 10% by weight of ε-caprolactam was charged in a stainless steel autoclave purged with nitrogen. Heating the autoclave was continued while water was being distilled off so that the internal pressure became 17.6 kg/cm². The pressure release was started when the internal temperature reached 240° C., and the pressure was gradually reduced to normal pressure in 90 minutes. Polymerization at normal pressure was effected by maintaining the reaction mixture at 268° C. and normal pressure for 30 minutes. The polymer thus obtained was pushed out by nitrogen pressure into cold water, and chipped with a cutter. The polymer thus obtained had a relative viscosity of 54, an amino end group concentration of 44 meq/kg and a carboxyl end group concentration of 64 meq/kg.

The chips were mixed with various compounds in a composition as shown in Table 4, and spun at a spinning temperature of 290° C. and a spinning rate of 5,500 m/min using a melt spinning machine for general use to give yarns of 50 d/20 f. Knitted fabrics were prepared from the yarns thus obtained, and the finishing agent was removed therefrom. The knitted fabrics were then heated at 190° C. for 5 minutes, and the yellowing factors (YI) of the fabrics were measured by the procedure described above. The results are shown in Table 4. The polyhexamethylene adipamide fibers containing compound A-1 in Examples 7 and 8 exhibited significant thermal yellowing resistances compared with those in Comparative Examples 9 and 10.

EXAMPLES 9 to 10

Comparative Examples 11 to 12

Polymerization was conducted in the same manner as in Example 7 except that an aqueous solution of a mixture of 80% by weight of hexamethylenediammonium adipate (AH salt) and 20% by weight of ε-caprolactam to give a polymer having a relative viscosity of 52, an amino end group concentration of 43 meq/kg and a carboxyl end group concentration of 64 meq/kg.

The chips were mixed with various compounds in a composition as shown in Table 4, and spun at a spinning temperature of 270° C. and a spinning rate of 5,500 m/min using a melt spinning machine for general use to give yarns of 50 d/20 f. Knitted fabrics were prepared from the yarns thus obtained, and the finishing agent was removed therefrom. The knitted fabrics were then heated at 190° C. for 5 minutes, and the yellowing factors (YI) of the fabrics were measured. The results are shown in Table 4.

The polyhexamethylene adipamide fibers in Examples 9 to 10 contained compound A-1 which was a triazine derivative represented by the general formula [I], and exhibited significantly inhibited thermal yellowing compared with the fibers to which compounds A-3, A-4, A-5 and A-6 had been added.

TABLE 4

|  | Polymer composition | | Compound group (A) (% by weight /polymer) | Compound group (B) (% by weight /polymer) | Fineness (denier) | Strength (g/d) | Elongation (%) | Shrinkage (%) in boiling water (%) | Yellowing factor (YI) (190° C. × 5 min) |
|---|---|---|---|---|---|---|---|---|---|
|  | AH salt (% by wt.) | ε-Caprolactam (% by wt.) |  |  |  |  |  |  |  |
| Ex. 7 | 90 | 10 | A-1 (0.10) | B-1 (0.05) | 50 | 5.74 | 39.2 | 11.5 | 6 |
| Ex. 8 | 90 | 10 | A-1 (0.10) | B-2 (0.05) | 50 | 5.72 | 39.4 | 11.3 | 7 |

TABLE 4-continued

| | Polymer composition | | Compound group | Compound group | | | | Shrink-age | Yellowing |
|---|---|---|---|---|---|---|---|---|---|
| | AH salt (% by wt.) | e-Caprolactam (% by wt.) | (A) (% by weight /polymer) | (B) (% by weight /polymer) | Fineness (denier) | Strength (g/d) | Elongation (%) | (%) in boiling water (%) | factor (YI) (190° C. × 5 min) |
| Ex. 9 | 80 | 20 | A-1 (0.10) | B-1 (0.05) | 50 | 5.59 | 34.9 | 21.4 | 6 |
| Ex. 10 | 80 | 20 | A-1 (0.10) | B-4 (0.05) | 50 | 5.57 | 35.1 | 20.8 | 6 |
| C. Ex. 9 | 90 | 10 | A-3 (0.10 | B-1 (0.05) | 50 | 5.70 | 39.5 | 11.3 | 26 |
| C. Ex. 10 | 90 | 10 | A-4 (0.10) | B-2 (a.05) | 50 | 5.74 | 39.1 | 11.5 | 25 |
| C. Ex. 11 | 80 | 20 | A-5 (0.10) | B-1 (0.05) | 50 | 5.59 | 34.8 | 21.2 | 25 |
| C. Ex. 12 | 80 | 20 | A-6 (0.10) | B-4 (0.05) | 50 | 5.60 | 34.6 | 21.4 | 27 |

It is evident that those polyhexamethylene adipamide fibers in Comparative Examples 9 to 12 in which compounds other than triazine derivatives represented by the general formula [I] were incorporated exhibited markedly deteriorated thermal yellowing resistance.

EXAMPLES 11 to 12

Comparative Examples 13 to 14

To a mixture of 90% by weight of the chips of a polyhexamethylene adipamide having a relative viscosity of 45, an amino end group concentration of 48 and a carboxyl end group concentration of 78 and 10% by weight of the chips of a poly-ε-capramide having a relative viscosity of 87, an amino end group concentration of 43 and a carboxyl end group concentration of 39, 0.2% by weight of ethylenebisstearmide was added. Various compounds in compositions shown in Table 5 were further added, and the resultant mixtures were spun at a spinning rate of 5,000 m/min using a melt spinning machine for general use to give yarns of 10 d/5 f. Knitted fabrics were produced from the yarns thus obtained, and a finishing agent was removed therefrom. The knitted fabrics were then heated at 190° C. for 5 minutes, and the yellowing factors (YI) of the fabrics were measured by the procedure described above. The results are shown in Table 5. The fibers in Examples 11 to 12 containing the triazine compound represented by the general formula [I] exhibited significantly decreased thermal yellowing, compared with the fibers in Comparative Examples 13 to 14.

EXAMPLES 13 to 14

Comparative Examples 15 to 16

To a mixture of 80% by weight of the chips of a polyhexamethylene adipamide having a relative viscosity of 45, an amino end group concentration of 48 and a carboxyl end group concentration of 78 and 20% by weight the chips of a polycapramide having a relative viscosity of 87, an amino end group concentration of 43 and a carboxyl end group concentration of 39, 0.2% by weight of ethylenebisstearmide was added. Various compounds in compositions shown in Table 5 were further added, and the resultant mixtures were spun at a spinning rate of 5,000 m/min using a melt spinning machine for general use to give yarns of 10 d/5 f. Knitted fabrics were produced from the yarns thus obtained, and a finishing agent was removed therefrom. The knitted fabrics were then heated at 190° C. for 5 minutes, and the yellowing factors (YI) of the fabrics were measured by the procedure described above. The results are shown in Table 5.

Since the fibers in Examples 13 to 14 contained the triazine derivative ([I], they exhibited significantly decreased thermal yellowing. It is evident from Comparative Examples 15 to 16 that the polyhexamethylene adipamide fibers containing other compounds exhibited markedly deteriorated resistance to thermal yellowing.

TABLE 5

| | Polymer composition | | Compound group (A) | Compound group (B) | | | | Shrink-age | Yellowing |
|---|---|---|---|---|---|---|---|---|---|
| | Nylon 66 (% by wt.) | Nylon 6 (% by wt.) | (% by weight /polymer) | (% by weight /polymer) | Fineness (denier) | Strength (g/d) | Elongation (%) | boiling water (%) | (YI) (190° C. × 5 min) |
| Ex. 11 | 90 | 10 | A-1 (0.10) | B-1 (0.05) | 10 | 5.62 | 33.5 | 9.6 | 5 |
| Ex. 12 | 90 | 10 | A-1 (0.10) | B-2 (0.05) | 10 | 560 | 33.4 | 9.1 | 6 |
| Ex. 13 | 80 | 20 | A-1 (0.10) | B-1 (0.05) | 10 | 5.56 | 33.0 | 10.3 | 5 |
| Ex. 14 | 80 | 20 | A-1 | B-4 | 10 | 5.53 | 33.2 | 10.5 | 5 |

TABLE 5-continued

| | Polymer composition | | Compound group (A) | Compound group (B) | (%) in Fine-ness (denier) | factor Strength (g/d) | Elonga-tion (%) | Shrink-age boil-ing water (%) | Yellow-ing (YI) (190° C. × 5 min) |
|---|---|---|---|---|---|---|---|---|---|
| | Nylon 66 (% by wt.) | Nylon 6 (% by wt.) | (% by weight /poly-mer) | (% by weight /poly-mer) | | | | | |
| C. Ex. 13 | 90 | 10 | (0.10) A-3 (0.10) | (0.05) B-1 (0.05) | 10 | 5.61 | 33.2 | 9.2 | 24 |
| C. Ex. 14 | 90 | 10 | A-4 (0.10) | B-2 (0.05) | 10 | 5.58 | 33.5 | 9.0 | 23 |
| C. Ex. 15 | 80 | 20 | A-5 (0.10) | B-1 (0.05) | 10 | 5.52 | 33.5 | 10.7 | 25 |
| C. Ex. 16 | 80 | 20 | A-6 (0.10) | B-4 (0.05) | 10 | 5.55 | 33.4 | 10.5 | 26 |

EXAMPLE 15

The following starting materials were charged in an autoclave having a capacity of 400 liters in the following proportion: hexamethylenediammonium adipate (AH salt) in 280 liters of an aqueous solution containing 50% by weight of it; hexamethylenediamine in 4.4 liters of an aqueous solution containing 14% by weight of it; titanium oxide in 0.4 liter of an aqueous solution containing 8% by weight of it; and disodium adipate in an amount of 0.104 kg.

The charged starting materials in an aqueous solution was first condensed in a condensation bath by heating at 150° C. for 4 hours to give an aqueous solution containing 80% by weight thereof. The aqueous solution was transferred to a polymerization bath, and heated further while the internal pressure was being adjusted to 17.5 kg/cm$^2$ and the condensation product (water) was being removed until the internal temperature reached 250° C. Polymerization was allowed to proceed for 1.5 hours The internal temperature was then raised to 280° C., and the internal pressure was gradually reduced to normal pressure in one hour. The internal temperature was further maintained at the same temperature for 30 minutes. The resultant polymer was pushed out with nitrogen gas, and cooled with water to give 130 kg of chips.

Table 6 shows the relative viscosity in formic acid of the polymer chips. The chips were spun at a spinning temperature of 300° C. and a spinning rate of 5,000 m/min to give yarns of 70 d/24 f. Evaluations were made of the cleaning period of the spinneret during the production of the fibers, and the amino and carboxyl end group concentrations of the yarns thus obtained and the yellowing of the knitted fabric after heat treatment at 190° C. for 5 minutes. Table 6 shows the results.

Example 15 shows that the thermal yellowing of the polyhexamethylene adipamide fibers which satisfied the condition that the carboxyl end group concentration was up to 60 meq/kg was greatly suppressed. Moreover, since the polymer was allowed to contain an alkali metal compound, deteriorated products caused by thermal decomposition of the polymer were hardly formed, and the cleaning period of the spinneret was extended, whereby the stabilized production over a long period of time became possible.

EXAMPLE 16

The following starting materials were charged in the following proportion: AH salt in 280 liters of an aqueous solution containing 50% by weight of it; hexamethylenediamine in 2.4 liters of an aqueous solution containing 14% by weight of it; titanium oxide in 0.4 liter of an aqueous solution containing 8% by weight of it; and disodium adipate in an amount of 0.065 kg; chips of a polymer was prepared in the same as in Example 15.

Evaluations were made of the relative viscosity in formic acid of the polymer chips, the cleaning period of the spinneret during spinning the chips in the same manner as in Example 15, the amino and carboxyl end group concentrations of the yarns thus obtained and the yellowing of the knitted fabric after heat treatment at 190° C. for 5 minutes Table 6 summarizes the results. Example 16 shows that since the fibers satisfied the condition that the carboxyl end group concentration was up to 60 meq/kg, fibers exhibiting greatly suppressed yellowing were obtained. Moreover, since the polymer was allowed to contain the alkali metal compound of the present invention, deteriorated products caused by thermal decomposition of the polymer were less formed, and the cleaning period of the spinneret was extended, whereby the stabilized production over a long period of time was realized.

Comparative Example 17

The following starting materials were charged in the following proportion: AH salt in 280 liters of an aqueous solution containing 50% by weight of it; hexamethylenediamine in 4.5 liters of an aqueous solution containing 14% by weight of it; and titanium oxide in 0.4 liter of an aqueous solution containing 8% by weight of it. Polymer chips were prepared by polymerization in the same as in Example 15.

Evaluations were made of the relative viscosity in formic acid of the polymer chips, the cleaning period of the spinneret during spinning the chips in the same manner as in Example 15, the amino and carboxyl end group concentrations of the yarns thus obtained and the yellowing of the knitted fabric after heat treatment at 190° C. for 5 minutes. Table 6 summarizes the results.

Comparative Example 17 shows that since the polymer was not allowed to contain the alkali metal compound, deteriorated products caused by thermal decomposition of the polymer were considerably formed though the amino end group concentration was relatively high, whereby the cleaning period of the spinneret became extremely short. Moreover, the thermal yellowing was remarkable.

Comparative Example 18

The following starting materials were charged in the following proportion: AH salt in 280 liters of an aqueous solution containing 50% by weight of it hexamethylenediamine in 2.5 liters of an aqueous solution containing 14% by weight of it; and titanium oxide in 0.4 liter of an aqueous solution containing 8% by weight of it. Polymer chips were then prepared by polymerization in the same manner as in Example 15.

Evaluations were made of the relative viscosity in formic acid of the polymer chips, the cleaning period of the spinneret during spinning the chips in the same manner as in Example 15, the amino and carboxyl end group concentrations of the yarns thus obtained and the yellowing of the knitted fabric after heat treatment at 190° C. for 5 minutes. Table 6 summarizes the results.

Comparative Example 18 shows that since the polymer was not allowed to contain the alkali metal compound, deteriorated products caused by thermal decomposition of the polymer were considerably formed even though the amino end group concentration was relatively high, whereby the cleaning period of the spinneret became extremely short. Moreover, the thermal yellowing was remarkable.

Comparative Example 19

The following starting materials were charged in the following proportion: AH salt in 280 liters of an aqueous solution containing 50% by weight of it; and titanium oxide in 0.4 liter of an aqueous solution containing 8% by weight of it. Polymer chips were then prepared by polymerization in the same manner as in Example 15.

Evaluations were made of the relative viscosity in formic acid of the polymer chips, the cleaning period of the spinneret during spinning the chips in the same manner as in Example 15, the amino and carboxyl end group concentrations of the yarns thus obtained and the yellowing of the knitted fabric after heat treatment at 190° C. for 5 minutes. Table 6 summarizes the results. Comparative Example 19 shows that since the fibers did not satisfy the condition that the carboxyl end group concentration was up to 60 meq/kg, the thermal yellowing was remarkable.

Comparative Example 20

The following starting materials were charged in the following proportion: AH salt in 280 liters of an aqueous solution containing 50% by weight of it; adipic acid in 11.7 liters of an aqueous solution containing 4% by weight of it; and titanium oxide in 0.4 liter of an aqueous solution containing 8% by weight of it. Polymer chips were then prepared by polymerization in the same manner as in Example 15.

Evaluations were made of the relative viscosity in formic acid of the polymer chips, the cleaning period of the spinneret during spinning the chips in the same manner as in Example 15, the amino and carboxyl end group concentrations of the yarns thus obtained and the yellowing of the knitted fabric after heat treatment at 190° C. for 5 minutes. Table 6 summarizes the results. Comparative Example 20 shows that since the fibers did not satisfy the condition that the carboxyl end group concentration was up to 60 meq/kg, the thermal yellowing was remarkable.

EXAMPLE 17

The following starting materials were charged in the following proportion: AH salt in 280 liters of an aqueous solution containing 50% by weight of it; hexamethylenediamine in 4.4 liters of an aqueous solution containing 14% by weight of it; titanium oxide in 0.4 liter of an aqueous solution containing 8% by weight of it; and disodium adipate in an amount of 0.065 kg. The polymer chips thus obtained were placed in a tumbler type solid phase polymerizer having a capacity of 400 liters, and heated at 180° C. for 20 hours under a nitrogen stream to increase the polymerization degree.

Evaluations were made of the relative viscosity in formic acid of the polymer chips, the cleaning period of the spinneret during spinning the chips in the same manner as in Example 15, the amino and carboxyl end group concentrations of the yarns thus obtained and the yellowing of the knitted fabric after heat treatment at 190° C. for 5 minutes. Table 6 summarizes the results.

Example 17 shows that since the fibers satisfied the condition that the carboxyl end group concentration was up to 60 meq/kg, fibers exhibiting greatly suppressed thermal yellowing were obtained. Moreover, since the polymer was allowed to contain an alkali metal compound, deteriorated products caused by thermal decomposition of the polymer were less formed, and the cleaning period of the spinneret was extended, whereby the stabilized production over a long period of time was realized.

EXAMPLE 18

The following starting materials were charged in the following proportion: kH salt in 280 liters of an aqueous solution containing 50% by weight of it; hexamethylenediamine in 2.4 liters of an aqueous solution containing 14% by weight of it; titanium oxide in 0.4 liter of an aqueous solution containing 8% by weight of it; and disodium adipate in an amount of 0.039 kg. Polymer chips were then prepared by polymerization and solid phase polymerization in the same manner as in Example 17.

Evaluations were made of the relative viscosity in formic acid of the polymer chips, the cleaning period of the spinneret during spinning the chips in the same manner as in Example 15, the amino and carboxyl end group concentrations of the yarns thus obtained and the yellowing of the knitted fabric after heat treatment at 190° C. for 5 minutes. Table 6 summarizes the results.

Example 18 shows that since the yarns satisfied the condition that the carboxyl end group concentration was 60 meq/kg, fibers exhibiting greatly suppressed thermal yellowing were obtained. Moreover, since the polymer was allowed to contain an alkali metal compound, deteriorated products caused by thermal decomposition of the polymer were less formed, and the cleaning period of the spinneret was extended, whereby the stabilized production over a long period of time was thus realized.

Comparative Example 21

The following starting materials were charged in the following proportion: AH salt in 280 liters of an aqueous solution containing 50% by weight of it; adipic acid in 11.7 liters of an aqueous solution containing 4% by weight of it; and titanium oxide in 0.4 liter of an aqueous solution containing 8% by weight of it. Polymer chips were then prepared by polymerization and solid phase polymerization in the same manner as in Example 17.

Evaluations were made of the relative viscosity in formic acid of the polymer chips, the cleaning period of the spinneret during spinning the chips in the same manner as in Example 15, the amino and carboxyl end group concentrations of the yarns thus obtained and the yellowing of the knitted fabric after heat treatment at 190° C. for 5 minutes. Table 6 summarizes the results.

Comparative Example 21 shows that since the fibers did not satisfy the condition that the carboxyl end group concentration was up to 60 meq/kg, the thermal yellowing was remarkable.

TABLE 6

| | Relative viscosity in formic acid of polymer chips | [NH$_2$] meq/kg polymer | [COOH] meq/kg polymer | [NH$_2$]+ [COOH] meq/kg polymer | Alkali metal salt addition amount/ polymer (% by weight)* | Yellowing factor | Cleaning period of spinneret (hours) |
|---|---|---|---|---|---|---|---|
| Ex. 15 | 43.3 | 85 | 44 | 129 | 0.08 | 10 | 24 |
| Ex. 16 | 46.5 | 67 | 55 | 122 | 0.05 | 13 | 24 |
| C. Ex. 17 | 44.0 | 86 | 44 | 130 | — | 20 | 5 |
| C. Ex. 18 | 46.7 | 68 | 54 | 122 | — | 23 | 7 |
| C. Ex. 19 | 41.4 | 52 | 82 | 134 | — | 27 | 24 |
| C. Ex. 20 | 41.1 | 33 | 102 | 135 | — | 37 | 24 |
| Ex. 17 | 80.7 | 69 | 29 | 98 | 0.05 | 8 | 24 |
| Ex. 18 | 82.4 | 51 | 41 | 92 | 0.03 | 10 | 24 |
| C. Ex. 21 | 78.3 | 18 | 87 | 102 | — | 30 | 24 |

Note:
*Disodium adipate was used as the alkali metal salt.

EXAMPLES 19 to 23

To an aqueous solution of 50% by weight of hexamthylenediammonium adipate, 0.40% by weight of hexamethylenediamine, 0.05% by weight of dipotassium adipate and 52 ppm of manganese lactate based on the weight of the polymer were added to give starting materials in an aqueous solution.

The aqueous solution was charged in a stainless steel autoclave purged with nitrogen. Heating the contents was continued while water was being distilled off so that the internal pressure reached 17.6 kg/cm$^2$. When the internal temperature reached 220° C., TiO$_2$ in an aqueous solution containing 10% of it was added in an amount of 0.05% by weight, and the heating was continued.

The pressure release was started when the internal temperature reached 253° C. so that the pressure was gradually reduced to normal pressure in 90 minutes. Polymerization at normal pressure was effected by maintaining the internal temperature at 273° C. and the internal pressure at normal pressure for 30 minutes. The polymer thus obtained was pushed out by nitrogen pressure into cold water, and chipped with a cutter. The polymer thus obtained had a relative viscosity of 48, an amino end group concentration of 77 meq/kg and a carboxyl end group concentrationof 49 meq/kg.

The chips were mixed with various compounds in a composition as shown in Table 7, and spun at a spinning temperature of 290° C. and a spinning rate of 5,500 m/min using a melt spinning machine for general use to give yarns of 50 d/17 f. The results of various measurements made on the varns thus obtained are shown in Table 8.

Examples 19 to 23 are examples of polyhexamethylene adipamide fibers containing compound A-1 which is a compound represented of the general formula [I] and having carboxyl end group concentrations of up to 60 meq/kg and amino end group concentrations of at least 55 meq/kg. The fibers thus obtained had thermal yellowing resistances to an extremely high level. The fibers exhibited thermal yellowing resistances which exceeded those of polycapramide fibers and which reached a level comparable to that of polyester fibers. Moreover, the fibers thus obtained in the examples also had practically extremely useful properties, that is, the fibers had high rates of dye exhaustion (deep dyeability) and high retentions of strength during treatment with pressurized hot water at high temperature.

Comparative Examples 22 to 26

A polymer was produced under the same conditions as in Example 19 except that 0.30% by weight of adipic acid based on the polymer was used in place of hexamethylenediamine The polymer thus obtained had a relative viscosity of 45, an amino end group concentration of 24 meq/kg and a carboxyl end group concentration of 99 meq/kg.

The polymer was mixed with various compounds in a composition as shown in Table 7, and the mixture was spun under the same conditions as in Example 19 to give yarns of 50 d/17 f. Measurements were made on the yarns thus obtained, and the results are shown in Table 8.

Since Comparative Examples 22 to 26 did not satisfy any of conditions of the requirement of the present invention, the fibers exhibited considerable thermal yellowing. Moreover, the fibers exhibited extremely low rates of dye exhaustion and retentions of strength during treatment with pressurized hot water at high temperature.

TABLE 7

| | Relative viscosity | [—NH$_2$] (meq/kg) | [—COOH] (meq/kg) | Alkali metal compound (wt.%/ polymer)* | Compound group (A) (wt.%/ polymer) | Compound group (B) (wt.%/ polymer) |
|---|---|---|---|---|---|---|
| Ex. 19 | 48 | 77 | 49 | (0.05) | A-1 (0.10) | B-1 (0.05) |
| Ex. 20 | 48 | 77 | 49 | (0.05) | A-1 (0.15) | B-1 (0.15) |

TABLE 7-continued

|  | Relative viscosity | [—NH₂] (meq/kg) | [—COOH] (meq/kg) | Alkali metal compound (wt.%/polymer)* | Compound group (A) (wt.%/polymer) | Compound group (B) (wt.%/polymer) |
|---|---|---|---|---|---|---|
| Ex. 21 | 48 | 77 | 49 | (0.05) | A-1 (0.10) | B-2 (0.05) |
| Ex. 22 | 48 | 77 | 49 | (0.05) | A-1 (0.10) | B-3 (0.10) |
| Ex. 23 | 48 | 77 | 49 | (0.05) | A-1 (0.10) | B-4 (0.05) |
| CE. 22 | 45 | 24 | 99 | (0.05) | — | — |
| CE. 23 | 45 | 24 | 99 | (0.05) | — | B-1 (0.10) |
| CE. 24 | 45 | 24 | 99 | (0.05) | A-3 (0.20) | B-1 (0.10) |
| CE. 25 | 45 | 24 | 99 | (0.05) | A-4 (0.10) | B-1 (0.05) |
| CE. 26 | 45 | 24 | 99 | (0.05) | A-5 (0.10) | B-1 (0.05) |

Note:
*Dipotassium adipate was used as the alkali metal compound.

TABLE 8

|  | Fineness (denier) | Strength (g/d) | Elongation (%) | Shrinkage (%) in boiling water (%) | Break rate (times/ton) | Rate of dye exhaustion (%) | Retention of strength # (%) | Yellowing factor (YI) (190° C. × 5 min) | Whiteness (W) (190° C. × 5 min) |
|---|---|---|---|---|---|---|---|---|---|
| Ex. 19 | 50 | 4.63 | 65.2 | 3.6 | 3 | 75 | 78 | <1 | 95 |
| Ex. 20 | 50 | 4.61 | 65.4 | 3.6 | 4 | 74 | 82 | <1 | 95 |
| Ex. 21 | 50 | 4.60 | 65.2 | 3.6 | 5 | 75 | 80 | <1 | 94 |
| Ex. 22 | 50 | 4.58 | 66.3 | 3.5 | 3 | 76 | 78 | 1 | 93 |
| Ex. 23 | 50 | 4.64 | 65.0 | 3.5 | 3 | 74 | 81 | ≦1 | 95 |
| CE. 22 | 50 | 4.62 | 65.2 | 3.6 | 3 | 22 | 18 | 36 | 67 |
| CE. 23 | 50 | 4.66 | 65.2 | 3.6 | 5 | 23 | 17 | 27 | 71 |
| CE. 24 | 50 | 4.63 | 65.4 | 3.5 | 3 | 22 | 19 | 26 | 71 |
| CE. 25 | 50 | 4.62 | 653 | 3.6 | 3 | 22 | 18 | 25 | 72 |
| CE. 26 | 50 | 4.62 | 65.4 | 3.5 | 4 | 21 | 18 | 27 | 70 |

Note:
Retention of strength during treatment with pressurized hot water at high temperature

EXAMPLES 24 to 28

Comparative Examples 27 to 31

A polymer was prepared under the same conditions as in Example 19 except that the addition amount of hexamethylenediamine was altered or adipic acid was added as shown in Table 9, and that the normal pressure polymerization time was changed as shown therein. The resultant polymer was then subjected to solid phase polymerization under the conditions as shown therein.

TABLE 9

|  | Addition amount of hexamethylene diamine (wt. % based on polymer) | Addition amount of adipic acid (wt. % based on polymer) | Normal pressure polymerization time (273° C., min) | Solid phase polymerization time (180° C., hr) |
| --- | --- | --- | --- | --- |
| Ex. 24 | 0.62 | 0 | 30 | 23 |
| Ex. 25 | 0.40 | 0 | 30 | 0 |
| Ex. 26 | 0.55 | 0 | 15 | 0 |
| Ex. 27 | 0.61 | 0 | 35 | 0 |
| Ex. 28 | 0.97 | 0 | 20 | 0 |
| Comp. Ex. 27 | 0.21 | 0 | 15 | 0 |
| Comp. Ex. 28 | 0.10 | 0 | 10 | 0 |
| Comp. Ex. 29 | 0 | 0 | 30 | 0 |
| Comp. Ex. 30 | 0 | 0.27 | 35 | 0 |
| Comp. Ex. 31 | 0 | 0.15 | 30 | 22 |

Table 10 shows the physical properties of the polymers thus obtained. The polymers were mixed with compounds in compositions as shown in Table 10, and the mixtures were spun under the same conditions as in Example 19 to give yarns of 50 d/17 f. Table 11 shows the results of various measurements made on the yarns thus obtained.

Examples 24 to 28 are examples of polyhexamethylene adipamide fibers containing a compound of the general formula [I] and having carboxyl end group concentrations of up to 60 meq/kg and amino end group concentrations of at least 55 meq/kg. The fibers thus obtained had thermal yellowing resistances to a high level. The fibers exhibited thermal yellowing resistances the level of which exceeded that of polycapramide fibers and became comparable to that of polyester fibers. Since the polyhexamethylene adipamide fibers thus obtained in the examples had high rates of dye exhaustion with an acid dye and high retentions of strength after treatment with hot water at high temperature, the fibers were practically extremely useful. The fibers in Comparative Examples 27 to 31 were instances of polyhexamethylene adipamide fibers having thermal stabilizer concentrations and end group concentrations outside the scope of the present invention, and exhibited markedly deteriorated thermal yellowing resistances.

TABLE 10

|  | Relative viscosity | [—NH$_2$] (meq/kg) | [—COOH] (meq/kg) | Alkali metal compound (% by weight)* | Compound group (A) | Compound group (B) |
| --- | --- | --- | --- | --- | --- | --- |
| Ex. 24 | 81 | 76 | 16 | (0.05) | A-1 (0.10) | B-1 (0.05) |
| Ex. 25 | 48 | 77 | 49 | (0.05) | A-1 (0.10) | B-4 (0.05) |
| Ex. 26 | 34 | 102 | 51 | (0.05) | A-1 (0.10) | B-1 (0.05) |
| Ex. 27 | 48 | 92 | 34 | (0.05) | A-1 (0.10) | B-4 (0.10) |
| Ex. 28 | 35 | 131 | 19 | (0.05) | A-1 (0.10) | B-1 (0.05) |
| CE. 27 | 34 | 76 | 76 | (0.05) | — | — |
| CE. 28 | 29 | 77 | 88 | (0.05) | — | — |

TABLE 10-continued

|  | Relative viscosity | [—NH$_2$] (meq/kg) | [—COOH] (meq/kg) | Alkali metal compound (% by weight)* | Compound group (A) | Compound group (B) |
|---|---|---|---|---|---|---|
| CE. 29 | 46 | 48 | 78 | (0.05) | — | — |
| CE. 30 | 46 | 24 | 99 | (0.05) | — | — |
| CE. 31 | 80 | 21 | 71 | (0.05) | — | — |

Note:
*Dipotassium adipate was used as the alkali metal compound.

TABLE 11

|  | Fineness (denier) | Strength (g/d) | Elongation (%) | Shrinkage (%) in boiling water (%) | Break rate (times /ton) | Rate of dye exhaustion (%) | Retention of strength# (%) | Yellowing factor (YI) (190° C. × 5 min) |
|---|---|---|---|---|---|---|---|---|
| Ex. 24 | 50 | 4.12 | 71.6 | 4.2 | 4 | 74 | 81 | <1 |
| Ex. 25 | 50 | 4.63 | 65.2 | 3.6 | 3 | 76 | 78 | <1 |
| Ex. 26 | 50 | 4.81 | 65.5 | 3.3 | 3 | 99 | 82 | <1 |
| Ex. 27 | 50 | 4.60 | 65.3 | 3.5 | 4 | 89 | 82 | <1 |
| Ex. 28 | 50 | 4.83 | 65.2 | 3.3 | 3 | 100 | 84 | <1 |
| CE. 27 | 50 | 4.79 | 65.4 | 3.3 | 3 | 74 | 65 | 30 |
| CE. 28 | 50 | 4.88 | 65.3 | 3.2 | 3 | 76 | 60 | 34 |
| CE. 29 | 50 | 4.60 | 65.2 | 3.6 | 3 | 45 | 21 | 32 |
| CE. 30 | 50 | 4.59 | 66.0 | 3.5 | 4 | 21 | 18 | 36 |
| CE. 31 | 50 | 4.11 | 71.5 | 4.2 | 3 | 18 | 20 | 30 |

Note:
Retention of strength during treatment with pressurized hot water at high temperature

EXAMPLE 29

A polymer was produced with the same composition under the same condition as in Example 25 except that 0.05% by weight of disodium adipate based on the weight of the polymer was added as the alkali metal compound in place of dipotassium adipate. The physical property of the polymer thus obtained is shown in Table 12. The polymer was mixed with compounds in a composition as shown in the table, and spun under the same spinning conditions as in Example 25 to give yarns of 50 d/17 f. The results of various measurements made on the yarns thus obtained are shown in Table 13.

EXAMPLE 30

A polymer was produced with the same composition under the same condition as in Example 27 except that 0.10% by weight of disodium adipate based on the weight of the polymer was added as the alkali metal compound in place of dipotassium adipate. The physical property of the polymer thus obtained is shown in Table 12. The polymer was mixed with compounds in a composition as shown in the table, and spun under the same spinning conditions as in Example 27 to give yarns of 50 d/17 f. The results of various measurements made on the yarns thus obtained are shown in Table 13.

Comparative Examples 32 to 33

Polymers were produced with the same compositions under the same conditions as in Examples 25 and 27 except that the alkali metal compound was not added. The physical properties of the polymers thus obtained are shown in Table 12. The polymers were tried to be spun under the same spinning conditions as in Examples 25 and 27 to give yarns of 50 d/17 f. The results of various measurements made on the fibers thus obtained are shown in Table 13.

Since the polymers in Examples 25, 27, 29 and 30 were allowed to contain the alkali metal compounds, containing the alkali metal compounds as an essential requirement of the process in the present invention, the fibers thus obtained achieved a stabilized spinning level though the polymers had relatively high amino end group concentrations.

On the other hand, since the polymers in Comparative Examples 32 and 33 did not contain any alkali metal compounds, drips frequently occurred and extremely many breaks took place during spinning. As a result, the stabilized production of the fibers of the present invention was difficult.

TABLE 12

|  | Relative viscosity | [—NH$_2$] (meq/kg) | [—COOH] (meq/kg) | Alkali metal compound (wt. %) | Compound group (A) | Compound group (B) |
|---|---|---|---|---|---|---|
| Ex. 25 | 48 | 77 | 49 | DPA* (0.05) | A-1 (0.10) | B-1 (0.05) |
| Ex. 29 | 48 | 77 | 49 | DSA# (0.05) | A-1 (0.10) | B-1 (0.05) |
| Ex. 27 | 48 | 92 | 34 | DPA* (0.05) | A-1 (0.10) | B-1 (0.05) |
| Ex. 30 | 48 | 92 | 34 | DSA# (0.10) | A-1 (0.10) | B-1 (0.05) |
| C.E. 32 | 48 | 77 | 49 | — | — | — |
| C.E. 33 | 48 | 92 | 34 | — | — | — |

Note:
*DPA = dipotassium adipate; #DSA = disodium adipate

TABLE 13

|  | Fineness (denier) | Strength (g/d) | Elongation (%) | Shrinkage (%) in boiling water (%) | Break rate (times /ton) | Rate of dye exhaustion (%) | Retention of strength# (%) | Yellowing factor (YI) (190° C. × 5 min) |
|---|---|---|---|---|---|---|---|---|
| Ex. 25 | 50 | 4.63 | 65.2 | 3.6 | 3 | 76 | 78 | <1 |
| Ex. 29 | 50 | 4.64 | 65.1 | 3.6 | 3 | 78 | 78 | <1 |
| Ex. 27 | 50 | 4.60 | 65.3 | 3.5 | 4 | 89 | 82 | <1 |
| Ex. 30 | 50 | 4.58 | 66.2 | 3.5 | 3 | 88 | 80 | <1 |
| CE. 32 | 50 | 4.55 | 64.0 | 3.5 | 36 | 78 | 43 | 23 |
| CE. 33 | 50 | 4.52 | 64.3 | 3.5 | 61 | 88 | 48 | 20 |

Note:
Retention of strength during treatment with pressurized hot water at high temperature EXAMPLES 31 to 34

Comparative Examples 34 to 37

To an aqueous solution containing hexamthylenediammonium adipate (AH salt) and ε-caprolactam in a proportion as shown in Table 15, hexamethylenediamine or adipic acid was added in a proportion as shown in Table 14, and dipotassium adipate was also added in an amount of 0.05% by weight based on the weight of the polymer to give starting materials in an aqueous solution.

TABLE 14

|  | Addition amount of hexamethylenediamine (% by weight based on polymer) | Addition amount of adipic acid (% by weight based on polymer) |
|---|---|---|
| Ex. 31 | 0.32 | 0 |
| Ex. 32 | 0.20 | 0 |
| Comp. Ex. 34 | 0 | 0.07 |
| Comp. Ex. 35 | 0 | 0 |
| Ex. 33 | 0.28 | 0 |
| Ex. 34 | 0.20 | 0 |
| Comp. Ex. 36 | 0 | 0 |
| Comp. Ex. 37 | 0 | 0.06 |

The aqueous solution was charged in an autoclave purged with nitrogen. Heating the autoclave was continued while water was being distilled off so that the internal pressure became 17.6 kg/cm$^2$. The pressure release was started when the internal temperature reached 240° C., and the pressure was gradually reduced to normal pressure in 90 minutes. Polymerization at normal pressure was effected by maintaining the reaction mixture at 268° C. and normal pressure for 30 minutes. The polymer thus obtained was pushed out by nitrogen pressure into cold water, and chipped with a cutter. Table 15 shows the relative viscosity and the end group concentrations of the polymers thus obtained.

The chips were mixed with various compounds in compositions as shown in Table 15, and spun at a spinning temperature of 290° C. and a spinning rate of 5,500 m/min using a melt spinning machine for general use to give yarns of 50 d/20 f. Table 16 shows the results of various measurements made on the yarns thus obtained.

Examples 31 to 34 are examples of polyhexamethylene adipamide fibers containing a compound of the general formula [I] and having carboxyl end group concentrations of up to 60 meq/kg and amino end group concentrations of at least 55 meq/kg. The fibers thus obtained had thermal yellowing resistances to an extremely high level. The fibers exhibited thermal yellowing resistances the level of which exceeded that of poly-ε-capramide fibers and became comparable to that of polyester fibers. The fibers had high rates of dye exhaustion (deep dyeability) and high retentions of strength during treatment with pressurized hot water at high temperature, that is, the fibers had practically extremely useful properties.

The compositions in Comparative Examples 34 to 37 exhibited marked thermal yellowing. Moreover, both the rates of dye exhaustion and the retentions of strength during treatment with pressurized hot water at high temperature were extremely low.

TABLE 15

| | Polymerization composition | | | | | Alkali metal pound (wt. %/ polymer)* | Compound group (A) (wt. %/ polymer) | Compound group (B) (wt. %/ polymer) |
|---|---|---|---|---|---|---|---|---|
| | AH salt (% by wt.) | e-Caprolactam (% by wt.) | Relative viscosity | [—NH₂] (meq/kg) | [—COOH] (meq/kg) | | | |
| Ex. 31 | 90 | 10 | 54 | 72 | 39 | (0.05) | A-1 (0.10) | B-1 (0.05) |
| Ex. 32 | 90 | 10 | 55 | 61 | 49 | (0.05) | A-1 (0.10) | B-4 (0.05) |
| C. E. 34 | 90 | 10 | 54 | 38 | 72 | (0.05) | A-3 (0.10) | B-1 (0.05) |
| C. E. 35 | 90 | 10 | 54 | 45 | 65 | (0.05) | A-4 (0.10) | B-4 (0.10) |
| Ex. 33 | 80 | 20 | 52 | 67 | 40 | (0.05) | A-1 (0.10) | B-1 (0.05) |
| Ex. 34 | 80 | 20 | 52 | 60 | 47 | (0.05) | A-1 (0.10) | B-4 (0.02) |
| CE. 36 | 80 | 20 | 53 | 42 | 65 | (0.05) | A-3 (0.10) | B-1 (0.05) |
| CE. 37 | 80 | 20 | 52 | 38 | 69 | (0.05) | A-4 (0.10) | B-4 (0.05) |

Note:
*Dipotassiun adipate was used as the alkali metal compound.

TABLE 16

| | Fineness (denier) | Strength (g/d) | Elongation (%) | Shrinkage (%) in boiling water (%) | Break rate (times /ton) | Rate of dye exhaustion (%) | Retention of strength# (%) | Yellowing factor (YI) (190° C. × 5 min) |
|---|---|---|---|---|---|---|---|---|
| Ex. 31 | 50 | 5.72 | 39.3 | 11.4 | 4 | 70 | 80 | <1 |
| Ex. 32 | 50 | 5.75 | 39.0 | 11.5 | 3 | 59 | 77 | <1 |
| CE. 34 | 50 | 5.70 | 39.5 | 11.2 | 3 | 36 | 18 | 25 |
| CE. 35 | 50 | 5.72 | 39.3 | 11.3 | 3 | 44 | 21 | 24 |
| Ex. 33 | 50 | 5.53 | 34.8 | 20.9 | 3 | 65 | 75 | <1 |
| Ex. 34 | 50 | 5.60 | 35.0 | 21.0 | 3 | 58 | 76 | <1 |
| CE. 36 | 50 | 5.59 | 34.7 | 20.8 | 4 | 40 | 20 | 26 |
| CE. 37 | 50 | 5.57 | 35.1 | 20.8 | 3 | 37 | 18 | 25 |

Note:
Retention of strength during treatment with pressurized hot water at high temperature Possibility of Utilization in the Industry The polyhexamethylene adipamide fibers according to the present invention have significantly improved thermal yellowing resistance. It is a further advantage of the present invention that the present invention can provide polyhexamethylene adipamide fibers having thermal yellowing resistance to a high level and containing amino end groups with its concentration (content) variable in a wide range. Among the polyhexamethylene adipamide fibers of the present invention, those containing amino end groups at a relatively high concentration are fibers which have the high thermal yellowing resistance and which may be deeply dyed using an acid dye. The fibers have an astonishing advantage of showing a marked decrease in strength lowering caused by embrittlement when subjected to pressurized hot water treatment at high temperature. Accordingly, the fibers are expected to be used for creating new fabricated products because cross knitted products obtained from the polyhexamethylene adipamide fibers of the present invention and polyester fibers can be subjected to pleating and pressurized dyeing at high temperature, such processing as mentioned above having been impossible to be practiced in the prior art.

As described above, the present invention provides polyhexamethylene adipamide fibers which give fibers for clothing having a wide spectrum of properties incapable of being obtained from those prepared from conventional polyhexamethylene adipamide fibers and which are comparable to poly-ε-capramide fibers and polyester fibers as a material for fibers for clothing, and a commercial process for producing the same.

What is claimed is:

1. Polyhexamethylene adipamide fibers having the sum of an amino end group concentration (—NH₂) and a carboxyl end group concentration (—COOH) of 70 to 200 meq/kg, comprising, in the molecular chain, from 100 to 70% by weight of hexamethylene adipamide repeat units of the formula

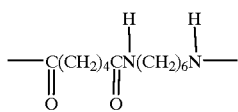

and satisfying the following conditions (a) and (b):
  (a) (—COOH)≦60 (meq/kg), and
  (b) said polyhexamethylene adipamide fibers comprise from 0.005 to 0.5% by weight of at least one alkali metal compound selected from a group consisting of disodium adipate and dipotassium adipate.

2. Polyhexamethylene adipamide fibers having the sum of an amino end group concentration (—NH$_2$) and a carboxyl end group concentration (—COOH) of 70 to 200 meq/kg, comprising, the molecular chain, from 100 to 70% by weight of hexamethylene adipamide repeat units of the formula

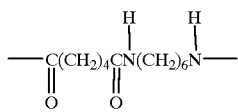

and satisfying the following conditions (a) and (b):
  (a) (—COOH)≦60 (meq/kg), and
  (b) said polyhexamethylene adipamide fibers comprise from 0.005 to 0.5% by weight of at least one alkali metal compound selected from alkali metal hydroxides, sodium sulfate, potassium nitrate and an alkali metal salt of mono- or di-carboxylic acid.

3. A polyhexamethylene adipamide composition of a polyhexamethylene adipamide having the sum of an amino end group concentration (—NH$_2$) and a carboxyl end group concentration (—COOH) of 70 to 200 meq/kg, comprising, in the molecular chain, from 100 to 70% by weight of hexamethylene adipamide repeat units of the formula

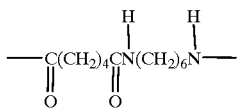

and which satisfies (a) (—COOH)≦60 (meq/kg), and comprises
  (b) from 0.005 to 0.5% by weight of at least one alkali metal compound selected from alkali metal hydroxides, sodium sulfate, sodium nitrate and an alkali metal salt of mono- or dicarboxylic acid.

* * * * *